(12) United States Patent
Krobath et al.

(10) Patent No.: US 10,876,474 B2
(45) Date of Patent: Dec. 29, 2020

(54) LENGTH-ADJUSTABLE CONNECTING ROD, DEVICE FOR SETTING A COMPRESSION RATIO AND INTERNAL COMBUSTION ENGINE

(71) Applicant: AVL LIST GMBH, Graz (AT)

(72) Inventors: Andreas Krobath, St. Josef (AT); Juergen Pichler, Graz (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 16/306,007

(22) PCT Filed: May 31, 2017

(86) PCT No.: PCT/EP2017/063231
§ 371 (c)(1),
(2) Date: Apr. 29, 2019

(87) PCT Pub. No.: WO2017/207671
PCT Pub. Date: Dec. 7, 2017

(65) Prior Publication Data
US 2020/0141311 A1  May 7, 2020

(30) Foreign Application Priority Data

May 31, 2016  (AT) .............................. A 50490/2016
Jul. 6, 2016   (AT) .............................. A 50600/2016

(51) Int. Cl.
*F02B 75/04*  (2006.01)
*F16C 7/06*   (2006.01)
*F02B 23/02*  (2006.01)

(52) U.S. Cl.
CPC ............ *F02B 75/045* (2013.01); *F02B 23/02* (2013.01); *F16C 7/06* (2013.01)

(58) Field of Classification Search
CPC ............ F02B 75/045; F02B 23/02; F16J 7/00
See application file for complete search history.

(56) References Cited

U.S. PATENT DOCUMENTS 988,344 A    4/1911  Holzmueller
1,610,137 A  12/1926 Kratsch
(Continued)

FOREIGN PATENT DOCUMENTS

AT  511803  3/2013
AT  514071  10/2014
(Continued)

OTHER PUBLICATIONS

Official Action for Austria Patent Application No. A 50490/2016, dated Nov. 23, 2016, 3 pages.
(Continued)

*Primary Examiner* — Jacob M Amick
*Assistant Examiner* — Charles Brauch
(74) *Attorney, Agent, or Firm* — Sheridan Ross P.C.

(57) ABSTRACT

The present invention relates to a length-adjustable connecting rod, to a device for setting a compression ratio and to an internal combustion engine. A length-adjustable connecting rod with a small connecting-rod eye and a large connecting-rod eye preferably has a switching device. The switching device is preferably designed to control the length of the connecting rod, in particular hydraulically. In addition, the connecting rod preferably has an adjustment device which is actuable, in particular mechanically, from outside the connecting rod, has a rotatably mounted adjustment unit and is designed to mechanically switch, in particular to actuate, the switching device by rotation of the adjustment unit.

15 Claims, 15 Drawing Sheets

(56) References Cited

U.S. PATENT DOCUMENTS

Figure 1B:
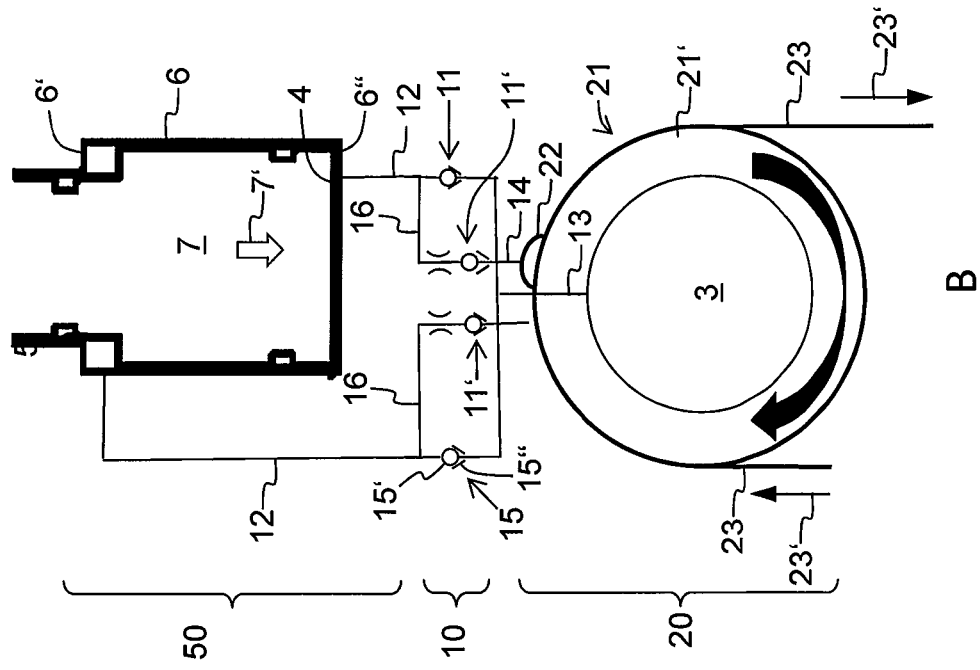

| | | | |
|---|---|---|---|
| 2,033,601 A | 3/1936 | Wohanka | |
| 2,134,995 A | 11/1938 | Anderson | |
| 2,217,721 A | 10/1940 | Anthony | |
| 2,252,153 A | 8/1941 | Anthony | |
| 2,778,378 A | 1/1957 | Presnell | |
| 2,989,954 A | 6/1961 | Hulbert | |
| 3,171,334 A | 3/1965 | Rasmussen | |
| 4,124,002 A | 11/1978 | Crise | |
| 4,140,091 A | 2/1979 | Showers, Jr. | |
| 4,195,601 A | 4/1980 | Crise | |
| 4,370,901 A | 2/1983 | Bolen | |
| 4,406,256 A | 9/1983 | Akkerman | |
| 5,178,103 A | 1/1993 | Simko | |
| 5,562,068 A | 10/1996 | Sugimoto et al. | |
| 5,724,863 A | 3/1998 | Kramer et al. | |
| 5,960,750 A | 10/1999 | Kreuter | |
| 6,394,048 B1 | 5/2002 | Styron | |
| 6,604,496 B2 | 8/2003 | Bartsch et al. | |
| 8,746,188 B2 | 6/2014 | Wilkins | |
| 9,528,546 B2 | 12/2016 | Melde-Tuczai | |
| 9,617,911 B2 | 4/2017 | Paul | |
| 9,670,952 B2 | 6/2017 | Melde-Tuczai et al. | |
| 9,845,738 B2 | 12/2017 | Pluta | |
| 10,294,859 B2 | 5/2019 | Melde-Tuczai et al. | |
| 2004/0187634 A1 | 9/2004 | Meyer | |
| 2008/0115769 A1 | 5/2008 | Mason | |
| 2008/0251158 A1* | 10/2008 | Koch | B27L 7/00 144/366 |
| 2009/0107467 A1 | 4/2009 | Berger | |
| 2009/0205615 A1 | 8/2009 | Cannata | |
| 2010/0132672 A1 | 6/2010 | Lee et al. | |
| 2010/0218746 A1 | 9/2010 | Rabhi | |
| 2013/0247879 A1* | 9/2013 | von Mayenburg | F16C 23/10 123/48 B |
| 2015/0122077 A1 | 5/2015 | Melde-Tuczai et al. | |
| 2015/0152794 A1 | 6/2015 | Paul | |
| 2016/0177997 A1 | 6/2016 | Ezaki et al. | |
| 2016/0222880 A1 | 8/2016 | Velazquez | |
| 2016/0305471 A1 | 10/2016 | Wittek | |
| 2016/0333780 A1 | 11/2016 | Kamo et al. | |
| 2018/0258846 A1 | 9/2018 | Kamo et al. | |
| 2018/0266313 A1 | 9/2018 | Melde-Tuczai et al. | |
| 2018/0363546 A1 | 12/2018 | Theissl | |
| 2018/0371988 A1 | 12/2018 | Melde-Tuczai et al. | |
| 2019/0234300 A1 | 8/2019 | Melde-Tuczai et al. | |
| 2019/0242300 A1 | 8/2019 | Pichler et al. | |

FOREIGN PATENT DOCUMENTS

| | | | |
|---|---|---|---|
| AT | 517100 | 11/2016 | |
| AT | 517112 | 11/2016 | |
| AT | 517217 | 12/2016 | |
| AT | 517492 | 2/2017 | |
| AT | 517619 | 3/2017 | |
| AT | 517624 | 3/2017 | |
| AT | 517718 | 4/2017 | |
| CN | 101109321 | 1/2008 | |
| CN | 102330561 | 1/2012 | |
| CN | 103047409 | 4/2013 | |
| CN | 103398001 | 11/2013 | |
| CS | 229539 | 6/1984 | |
| DE | 1205390 | 11/1965 | |
| DE | 1287345 | 1/1969 | |
| DE | 2161580 | 7/1973 | |
| DE | 2414020 | 10/1975 | |
| DE | 3149306 | 6/1983 | |
| DE | 8429462 | 2/1985 | |
| DE | 3507327 | 9/1986 | |
| DE | 4026492 | 2/1992 | |
| DE | 4133188 | 4/1992 | |
| DE | 4226361 | 4/1994 | |
| DE | 4315463 | 5/1994 | |
| DE | 29608749 | 7/1996 | |
| DE | 19612721 | 10/1996 | |
| DE | 19703948 | 6/1998 | |
| DE | 19703948 C1 * | 6/1998 | ............ F02B 75/045 |
| DE | 19835146 | 6/1999 | |
| DE | 10213890 | 10/2002 | |
| DE | 10201601 | 6/2003 | |
| DE | 10230427 | 1/2004 | |
| DE | 102005036701 | 2/2007 | |
| DE | 102005055199 | 5/2007 | |
| DE | 102007040699 | 3/2009 | |
| DE | 102008038971 | 2/2010 | |
| DE | 102010016037 | 9/2011 | |
| DE | 102011104934 | 12/2012 | |
| DE | 102012020999 | 1/2014 | |
| DE | 102013210494 | 12/2014 | |
| DE | 102013111617 | 4/2015 | |
| DE | 102013113432 | 6/2015 | |
| DE | 102014200162 | 7/2015 | |
| DE | 102014004987 | 10/2015 | |
| DE | 102015001066 | 10/2015 | |
| DE | 102014220177 | 5/2016 | |
| EP | 0438121 | 7/1991 | |
| EP | 1065393 | 1/2001 | |
| EP | 2280198 | 2/2011 | |
| FR | 2857408 | 1/2005 | |
| FR | 2889864 | 2/2007 | |
| GB | 161580 | 7/1922 | |
| GB | 898268 | 6/1962 | |
| GB | 2161580 | 1/1986 | |
| JP | S52-9703 | 1/1977 | |
| JP | S58-165543 | 9/1983 | |
| JP | S61-24804 | 2/1986 | |
| JP | 2003-129817 | 5/2003 | |
| JP | 2005-267420 | 9/2005 | |
| JP | 2010-112286 | 5/2010 | |
| JP | 2010-112448 | 5/2010 | |
| NL | 7602119 | 9/1977 | |
| RU | 2226626 | 4/2004 | |
| SU | 1008523 | 3/1983 | |
| WO | WO 96/01943 | 1/1996 | |
| WO | WO 02/10568 | 2/2002 | |
| WO | WO 2012/113349 | 8/2012 | |
| WO | WO 2014/005984 | 1/2014 | |
| WO | WO 2014/019684 | 2/2014 | |
| WO | WO 2014/188060 | 11/2014 | |
| WO | WO 2015/055582 | 4/2015 | |
| WO | WO 2015/082722 | 6/2015 | |
| WO | WO 2015/172168 | 11/2015 | |
| WO | WO 2015/193437 | 12/2015 | |
| WO | WO 2016/042605 | 3/2016 | |
| WO | WO 2016/083592 | 6/2016 | |
| WO | WO 2016/103554 | 6/2016 | |
| WO | WO 2016/203047 | 12/2016 | |
| WO | WO 2017/001229 | 1/2017 | |
| WO | WO 2017/025580 | 2/2017 | |

OTHER PUBLICATIONS

U.S. Appl. No. 15/737,423, filed Apr. 30, 2018.
U.S. Appl. No. 16/062,217, filed Jun. 14, 2018.
U.S. Appl. No. 16/062,238, filed Jun. 14, 2018.
U.S. Appl. No. 15/028,638, filed Apr. 11, 2016 now U.S. Pat. No. 10,294,859.
U.S. Appl. No. 16/306,028, filed Apr. 12, 2019.
U.S. Appl. No. 16/315,236, filed Apr. 19, 2019.
U.S. Appl. No. 16/338,071, filed Mar. 29, 2019.
U.S. Appl. No. 16/487,585, filed Aug. 21, 2019.
International Search Report prepared by the European Patent Office dated Aug. 8, 2017, for International Application No. PCT/EP2017/063231.

* cited by examiner

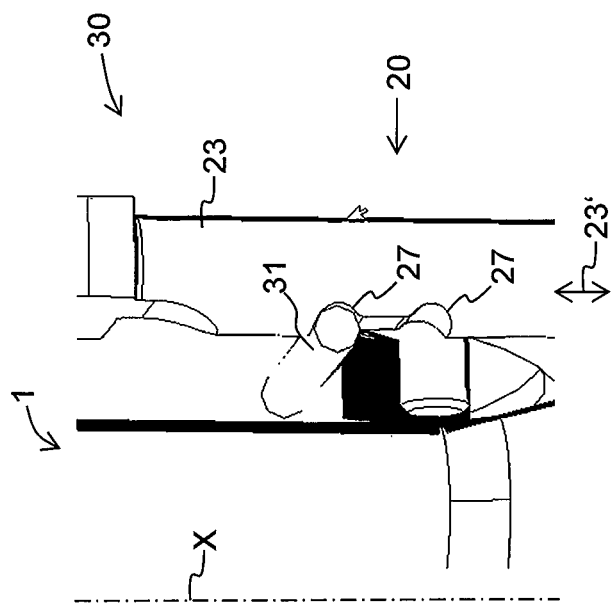
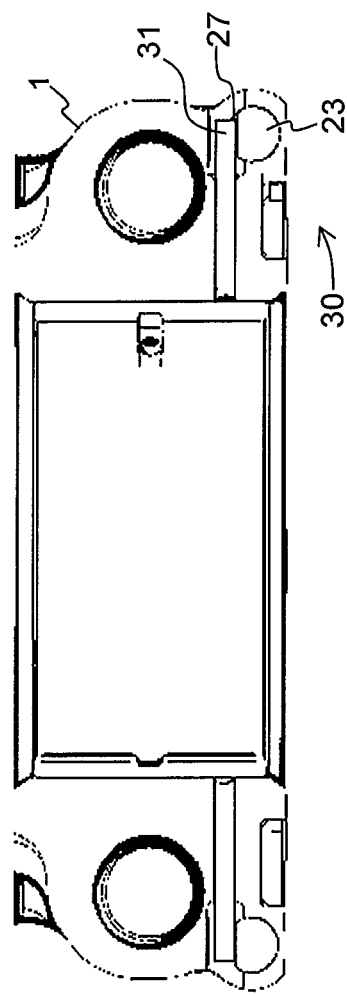
Fig. 5a
Fig. 5b

LENGTH-ADJUSTABLE CONNECTING ROD, DEVICE FOR SETTING A COMPRESSION RATIO AND INTERNAL COMBUSTION ENGINE

CROSS REFERENCE TO RELATED APPLICATIONS

This application is a national stage application under 35 U.S.C. 371 and claims the benefit of PCT Application No. PCT/EP2017/063231 having an international filing date of 31 May 2017, which designated the United States, which PCT application claimed the benefit of Austria Patent Application No. A 50490/2016 filed 31 May 2016 and Austria Patent Application No. A 50600/2016 filed 6 Jul. 2016, the disclosure of each of which are incorporated herein by reference.

The present invention relates to a piston rod of adjustable length, a device for setting a compression ratio using such a piston rod, and an internal combustion engine with such a device.

Internal combustion engines with an adjustable compression ratio are known in the prior art, in order to increase the power and/or efficiency of vehicles, in particular motorized vehicles. This involves varying the positions of the top dead center and the bottom dead center of a cyclically reciprocating piston in a cylinder of the internal combustion engine by varying the length of a piston rod in a suitable manner. In this way, the volume of the cylinder can be set in a variable manner. An internal combustion engine can therefore be operated at full load with a low compression ratio and at partial load or during the start-up process with an increased compression ratio so that peak pressures under full load can be reduced, the fuel consumption at partial load can be reduced, or the compression pressure at start-up can be increased.

Hydraulic systems are provided in some piston rods to control the length of the piston rod, which hydraulic systems can move parts of the piston rod that can be moved against each other and/or fix them in a desired position. Usually, two hydraulic chambers are provided for this purpose, each of which can be charged with a hydraulic medium.

US 2013 0 247 879 A1 relates to an internal combustion engine with one or more piston rods, each of which comprises an end piece for coupling to a crankshaft. An eccentric coupler couples the end piece to a crankpin and comprises a rotary slide, which projects into a receiving chamber. This divides the receiving chamber into several sections so that filling a first section with a liquid and draining the liquid from a second section rotates the rotary slide and hence the eccentric coupler in a first direction. A compression ratio regulator can be controlled so as to open a drain channel of the first section so that oil can be supplied from the first section to the opposite or second section.

It is an object of the invention to provide an improved piston rod of adjustable length, in particular a control mechanism for setting the length of a piston rod in a manner which saves installation space and/or is reliable.

This object is solved by a piston rod of adjustable length, a device for setting a compression ratio and an internal combustion engine in accordance with the independent claims. Advantageous embodiments of the invention are the subject of the dependent claims.

A first aspect of the invention relates to a piston rod of adjustable length, in particular a hydraulically length-adjustable piston rod, in particular for an internal combustion engine, with a small piston rod eye and a large piston rod eye, which internal combustion engine preferably comprises a switching device. The switching device is preferably arranged to control the length of the piston rod, in particular hydraulically. In addition, the piston rod preferably comprises a setting device which can be actuated from outside the piston rod, in particular mechanically, which comprises a rotatably mounted setting unit and which is arranged to mechanically switch, in particular actuate, the switching device by rotating the setting unit.

A second aspect of the invention relates to a device for setting a compression ratio in an internal combustion engine, in particular a reciprocating piston engine, which preferably has a piston rod of adjustable length, in particular a hydraulically length-adjustable piston rod, in accordance with the first aspect of the invention. In addition, the device preferably comprises an actuating device which is arranged to actuate, in particular rotate, the setting unit, in particular mechanically.

A third aspect of the invention relates to an internal combustion engine, in particular a reciprocating piston engine, which has a device for setting a compression ratio in accordance with the second aspect of the invention.

A fourth aspect of the invention relates to a vehicle, in particular a motorized vehicle, which has an internal combustion engine in accordance with the third aspect of the invention.

The invention is based in particular on the approach of mechanically switching, in particular actuating, a switching device, which is preferably arranged for setting a length of a piston rod of adjustable length, in particular hydraulically, by means of a rotation, in particular by means of a pivoting or a displacement of a rotatably mounted setting unit, which is part of a setting device. In this regard, the pivoting is preferably caused by a mechanical actuation of the setting unit carried out outside the piston rod.

The fact that the setting unit is mounted in such a way that it can be rotated, in particular pivoted or displaced, means that the actuation of the switching device can be performed or carried out in an advantageous manner, in particular in a reliable manner. Preferably, one or more switching states of the switching device, which is preferably arranged for controlling a flow of a hydraulic medium, can be reliably mechanically activated or switched, without the spatial position of the setting unit relative to the switching device, the piston rod or a piston rod eye of the piston rod changing during the activation or the switching. In particular, the rotatable mounting of the setting device can avoid a need for additional space for a movement of the setting device for activating or switching the switching device. In other words, the setting device can remain substantially in a congruent position during the movement that is necessary for the activation or the switching of the switching device.

The setting unit can transmit a torque onto the switching device during rotation, in particular onto a valve or a component of a valve of the switching device, which torque preferably causes the switching device to change the flow of the hydraulic medium through the piston rod or through hydraulic channels of the piston rod. Preferably, the torque can cause the switching device to feed a first hydraulic chamber of the piston rod with the hydraulic medium and to empty a second hydraulic chamber of the piston rod or vice versa, or to pressurize the hydraulic medium in the first hydraulic chamber with a pressure which is higher than the pressure of the hydraulic medium in the second hydraulic chamber or vice versa. This allows the length of the piston rod to be reliably controlled and a compression ratio in an internal combustion engine with such a piston rod to be set reliably.

Overall, the invention enables an improved piston rod of adjustable length, in particular an actuation of a switching device for controlling the length of the piston rod, which actuation is reliable and/or saves installation space.

The setting unit is preferably arranged along a contour of the piston rod in such a way that a protruding or projecting of the setting unit beyond the contour of the piston rod is avoided or at least reduced even when the setting unit is actuated, in particular when the setting unit is rotated or pivoted or displaced. Advantageously, the setting unit can be arranged along the contour in such a way that only a small amount of installation space is required.

In a preferred embodiment, the piston rod further comprises a hydraulically operated length adjustment device which is arranged to adjust the length of the piston rod. Preferably, the switching device is arranged to control a flow of a hydraulic medium for operating the length adjustment device. For this purpose, the switching device may comprise one or more valves which can be opened or closed by means of mechanical actuation by the setting unit. In this way, the length of the piston rod can be adjusted reliably.

In a further preferred embodiment, the setting unit comprises a ring slide which is rotatably mounted around the large piston rod eye of the piston rod and is arranged to transmit, to the switching device, a switching pulse received from outside the piston rod. Preferably, the ring slide is constructed in a semi-circular or annular shape and is arranged coaxially with the large piston rod eye. Particularly preferably, the ring slide has an inner diameter which substantially corresponds to the diameter of the large piston rod eye. In this way, the setting unit or the ring slide can be adapted to the contour of the piston rod and only takes up very little installation space.

During actuation, the setting unit or the ring slide is preferably subjected to a torque from outside the piston rod and is thereby rotated, in particular pivoted or displaced. Due to the rotation, the setting unit or the ring slide transmits the torque, preferably substantially undiminished, onto or to the switching device, which can adjust the length of the piston rod or control the flow of the hydraulic medium by means of the transmitted torque. This allows the switching device to be reliably switched, in particular actuated, or the length of the piston rod to be reliably adjusted.

In a further advantageous embodiment, the ring slide comprises a first ring element constructed in a semi-annular shape, in a variant, a first ring element constructed in a semi-annular shape and a second ring element constructed in a semi-annular shape. Preferably, the setting device further comprises two setting elements which are mounted displaceably along the piston rod, in particular along a piston rod longitudinal axis. In a variant, in which a first ring element constructed in a semi-annular shape is movably arranged around the half of the large piston rod eye facing towards the small piston rod eye, piston-side ends of the setting elements facing towards the small piston rod eye interact with the ends of the first ring element constructed in a semi-annular shape facing away from the small piston rod eye.

In the variant with the first ring element constructed in a semi-annular shape and the second ring element constructed in a semi-annular shape, piston-side ends of the setting elements respectively engage between the first and second ring elements.

In this way, an up or down movement of the setting elements along the piston rod, in particular along the longitudinal axis of the piston rod, can reliably cause a rotation of the ring slide. In particular, a torque, in particular a pulse, applied to at least one of the setting elements from outside the piston rod, can be reliably transmitted to the switching device, in particular by being converted into a torque of the ring slide.

Preferably, the first and second ring elements are constructed as identical parts. As a result, the first and second ring elements are neutral with respect to each other in terms of acceleration.

The arrangement described above allows the actuating pulse to be reliably transmitted or guided from an area of the large piston rod eye facing away from the small piston rod eye, in particular from an area of the crankshaft, into an area of the large piston rod eye facing towards the small piston rod eye, in particular in an area between the small piston rod eye and the large piston rod eye. The components of the setting device can be arranged and/or actuated, i.e. moved, in a manner which does not take up much installation space.

In a further advantageous embodiment, the switching device comprises at least one non-return valve for regulating the flow of the hydraulic medium. Preferably, the at least one non-return valve is configured or arranged so as to prevent one or more hydraulic chambers of the piston rod, in particular of the length adjustment device, from being emptied when in a closed state and/or to enable them to be emptied when in an open state. Preferably, the setting device is constructed so as to transfer the at least non-return valve from the closed state to the open state and vice versa, or to hold it in the closed state and/or the open state. This allows the flow of the hydraulic medium in the piston rod, in particular through hydraulic channels, in particular into or out of hydraulic chambers, to be reliably controlled.

Alternatively or additionally, the switching device may also comprise at least one slide valve for regulating the flow of the hydraulic medium. Similar to the preceding embodiment, the setting device can be arranged so as to actuate the at least one slide valve, i.e. to control the opening and closing of the valve.

In a further advantageous embodiment, the at least one non-return valve is constructed as a ball valve. Preferably, the setting device is arranged to lift a ball of the at least one ball valve from a valve seat of the at least one ball valve by means of a rotation of the setting unit, or to unblock the valve seat by means of a rotation of the setting unit. Preferably, the setting device or the switching device has one or more valve pins for this purpose, which are preferably arranged at least partially in a respective hydraulic channel. The valve pin is, or the valve pins are, particularly preferred to be moved by means of interaction with the setting unit, in particular axially displaced, in such a way that the ball can be lifted from the valve seat against a pressure of the hydraulic medium and/or against a spring force of a safety spring, or the valve seat unblocked. This means that the at least one non-return valve can be reliably actuated, i.e. opened or closed, and the inflow or outflow of hydraulic medium from one or more hydraulic chambers or into one or more hydraulic chambers can be controlled.

In a further advantageous embodiment, the setting unit comprises a ramp which is arranged to actuate the switching device, in particular a valve of the switching device. Preferably, the ramp is arranged to interact with at least one valve pin of the setting device or the switching device. In particular, one end of the valve pin is guided over the ramp in such a way that the valve pin can be moved, in particular axially displaced, and can thus actuate at least one valve, in particular a non-return valve, of the switching device. By means of the ramp, a rotary movement, in particular a pivoting movement, of the setting unit can be easily and reliably converted into a translational movement for actuating the switching device, in particular in a manner which does not require much installation space.

In a further advantageous embodiment, the piston rod comprises a locking device which is arranged to fix the setting device in a setting state. This enables the switching device to be actuated over a specified period of time. In particular, this allows at least one valve of the switching device to be kept opened or open at least until the hydraulic medium has flowed out of a hydraulic chamber. This enables a reliable adjustment of the length of the piston rod.

In a further advantageous embodiment, the setting device, in particular the setting unit and/or at least one of the setting elements, comprises at least one locking recess. Preferably, the locking device further comprises at least one tensionable locking pin. The at least one locking recess is preferably arranged in such a way, in particular at the setting unit and/or at at least one of the setting elements, that the locking pin engages in the locking recess in a setting state.

Preferably, the locking pin is made from spring steel wire and arranged in such a way that it can engage in a groove arranged transversely to a longitudinal axis of the setting elements. Alternatively or additionally, the locking pin can be clamped with a spring element and is arranged in such a way that one end thereof can engage in the at least one, preferably blind hole-like, locking recess.

This means that the setting device, in particular the setting unit and/or at least one of the setting elements, can enable the switching device to be actuated reliably, in particular over a specified period of time, even during the cyclic movement along a trajectory curve of the piston rod during operation of an internal combustion engine.

In an advantageous embodiment of the device for setting a compression ratio, the actuating device is constructed as a rocker switch with at least one rocker axle. The actuating device preferably comprises a rocker head with two effective surfaces which can be coupled to the setting device in such a way that tilting of the rocker head causes the setting unit to rotate. The rocker head is preferably constructed in such a way that one setting element of the setting device can interact respectively with one of the two effective surfaces.

Preferably, the actuating device is arranged in such a way that the setting device of the piston rod connected to a crankshaft of the internal combustion engine can interact with at least one of the two effective surfaces during the cyclic movement along a trajectory curve during operation of the internal combustion engine at a predetermined point of the trajectory curve, in particular receive an actuating pulse transmitted by the actuating device.

Preferably, by means of a specified tilting position of the rocker head, a corresponding switching state of the switching device is activated. In other words, different switching states of the switching device can be switched by tilting the rocker head.

The embodiments and arrangements of the actuating device mentioned above enable a reliable actuation of the setting device of the piston rod, in particular the transmission of an actuating pulse to the setting device.

In a further advantageous embodiment, the rocker head is mounted on the rocker axle in a rotationally fixed manner or is rotatably mounted on the rocker axle. Preferably, the rocker head can be pivoted by means of an actuator which is connected to the rocker axle or the rocker head via a rocker lever. This enables precise tilting of the rocker head and hence a reliable actuation of the setting device.

In a further advantageous embodiment, the actuating device is constructed as a switching platform with at least two actuating elements. Preferably, each actuating element comprises an effective surface which, by means of an eccentric element, which rests on an eccentric axle, can be moved in a direction perpendicular to the eccentric axle. Preferably several, in particular two, eccentric axles are mechanically connected to each other in such a way that two actuating elements can respectively be moved in opposite directions in order to actuate a setting device or can only move in opposite directions. In this way, it is ensured that only one of the actuating elements at a time can interact with the setting device, in particular with a setting element.

The features and advantages described in relation to the first aspect of the invention and its advantageous embodiment also apply, where technically reasonable, to the second, third and fourth aspects of the invention and its advantageous embodiment and vice versa.

Figure 1A:
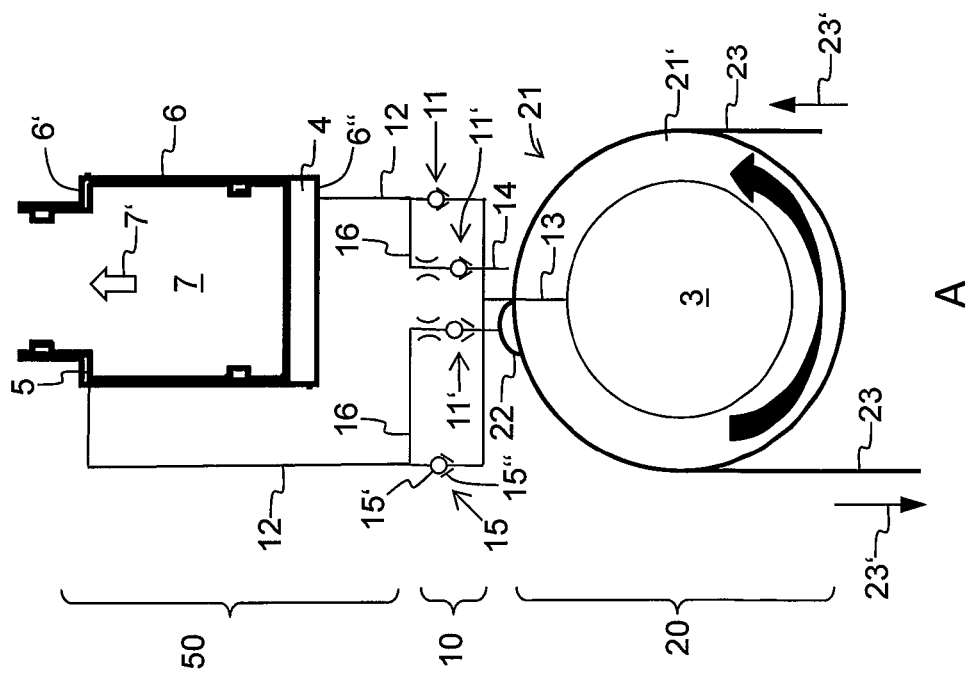
Figure 2:
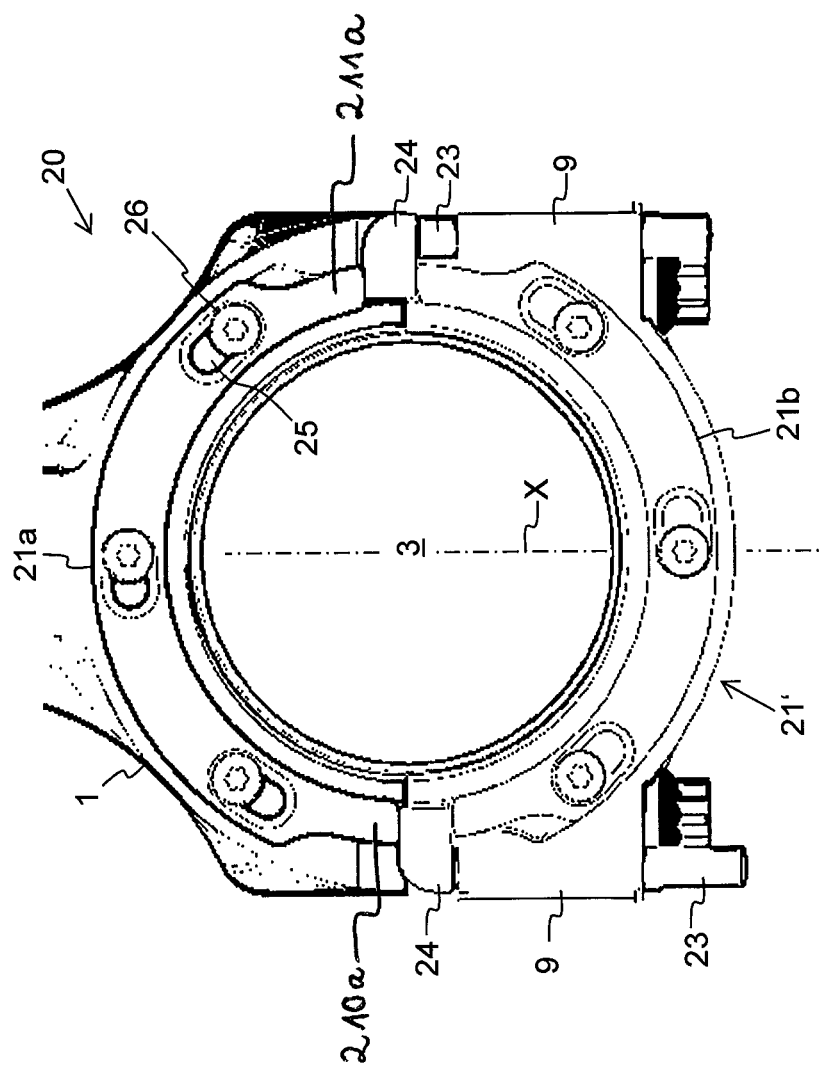
Figure 3:
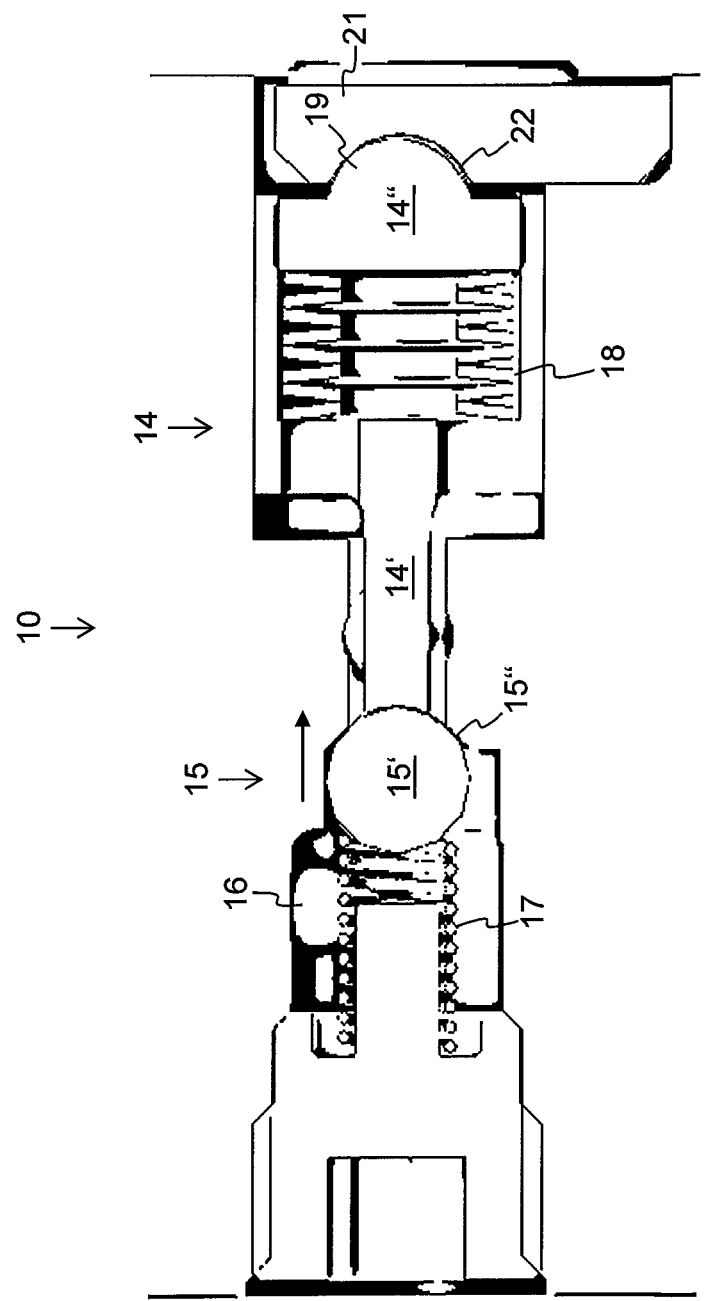
Figure 4B:
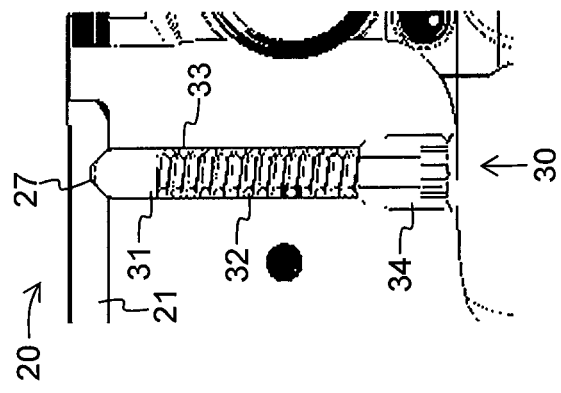
Figure 4A:
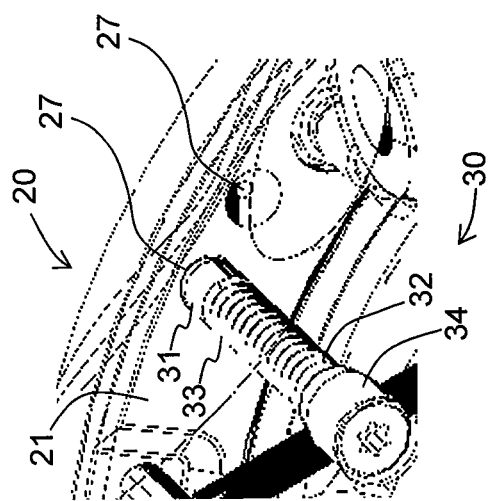
Figure 6:
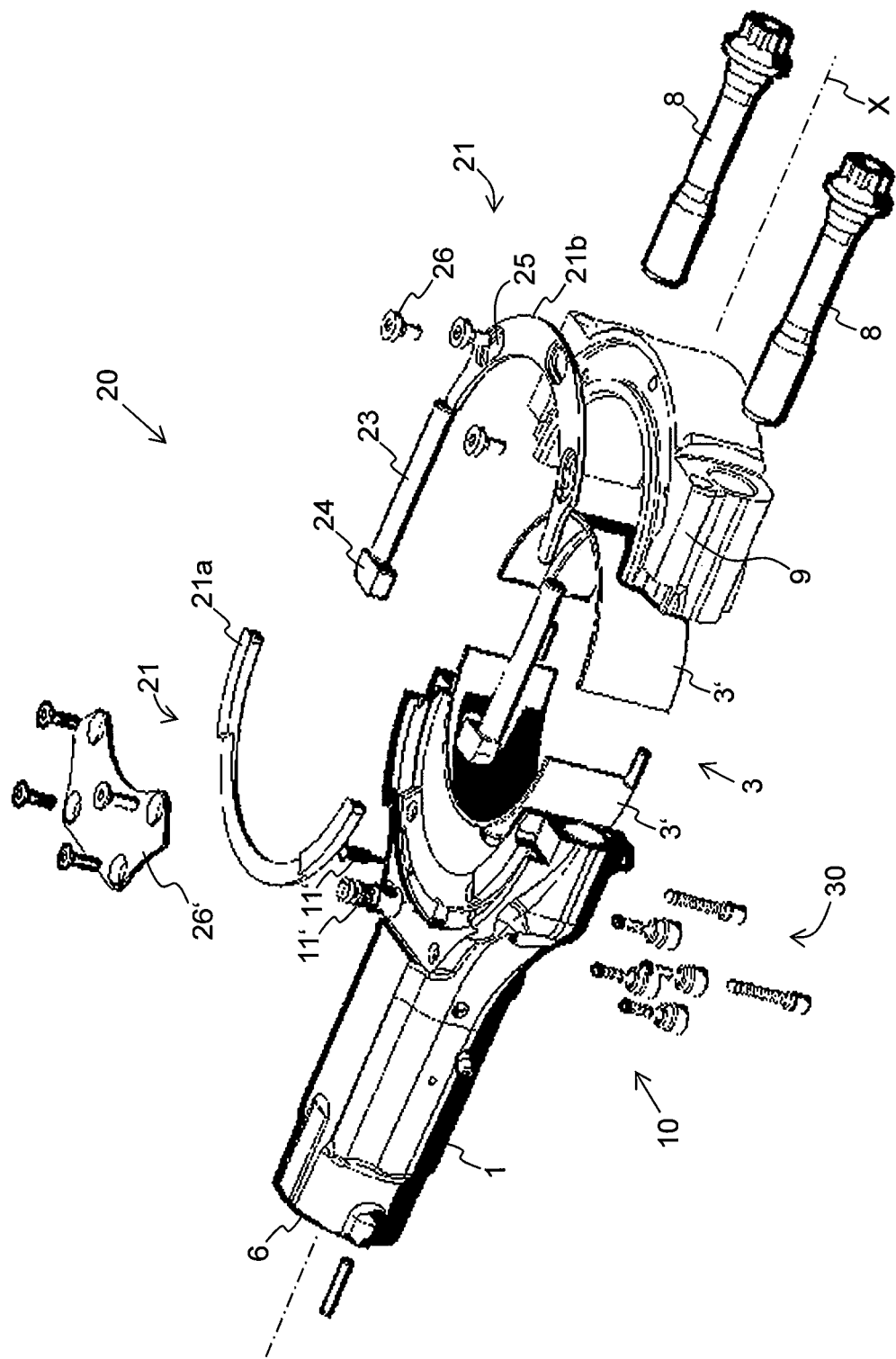
Figure 7:
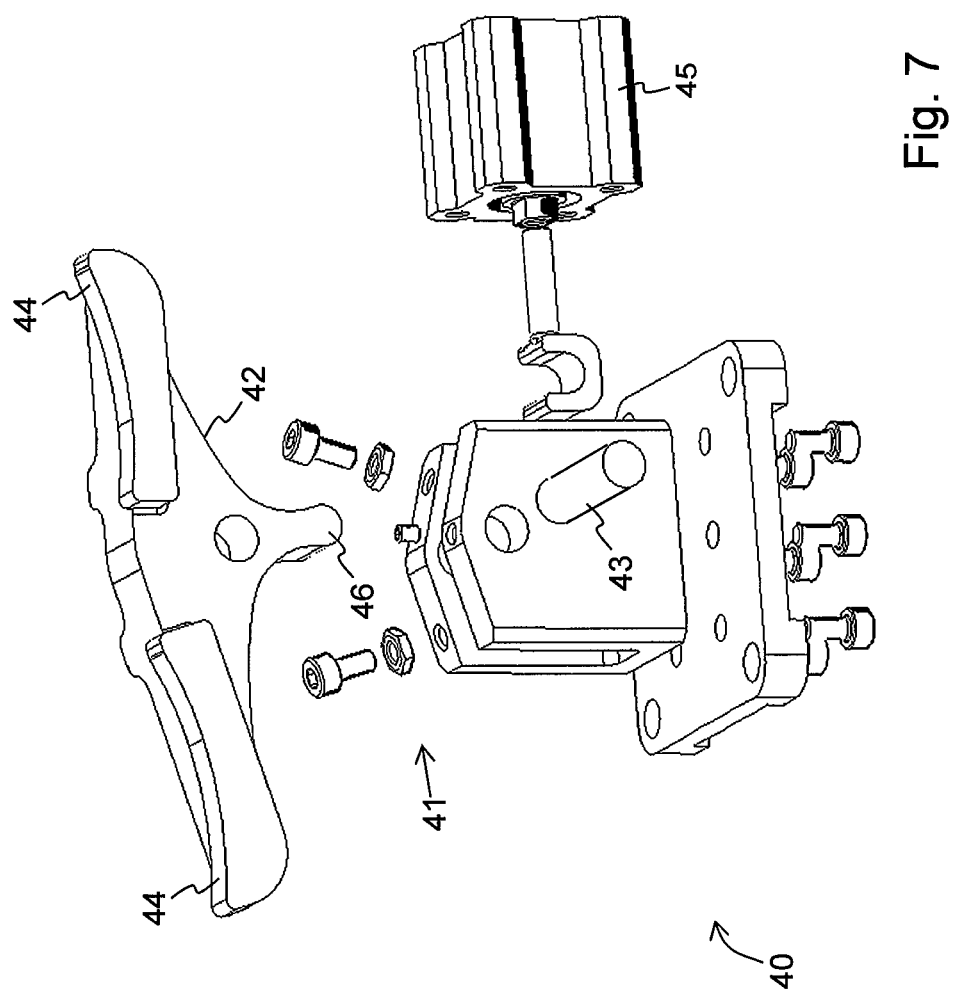
Figure 8:
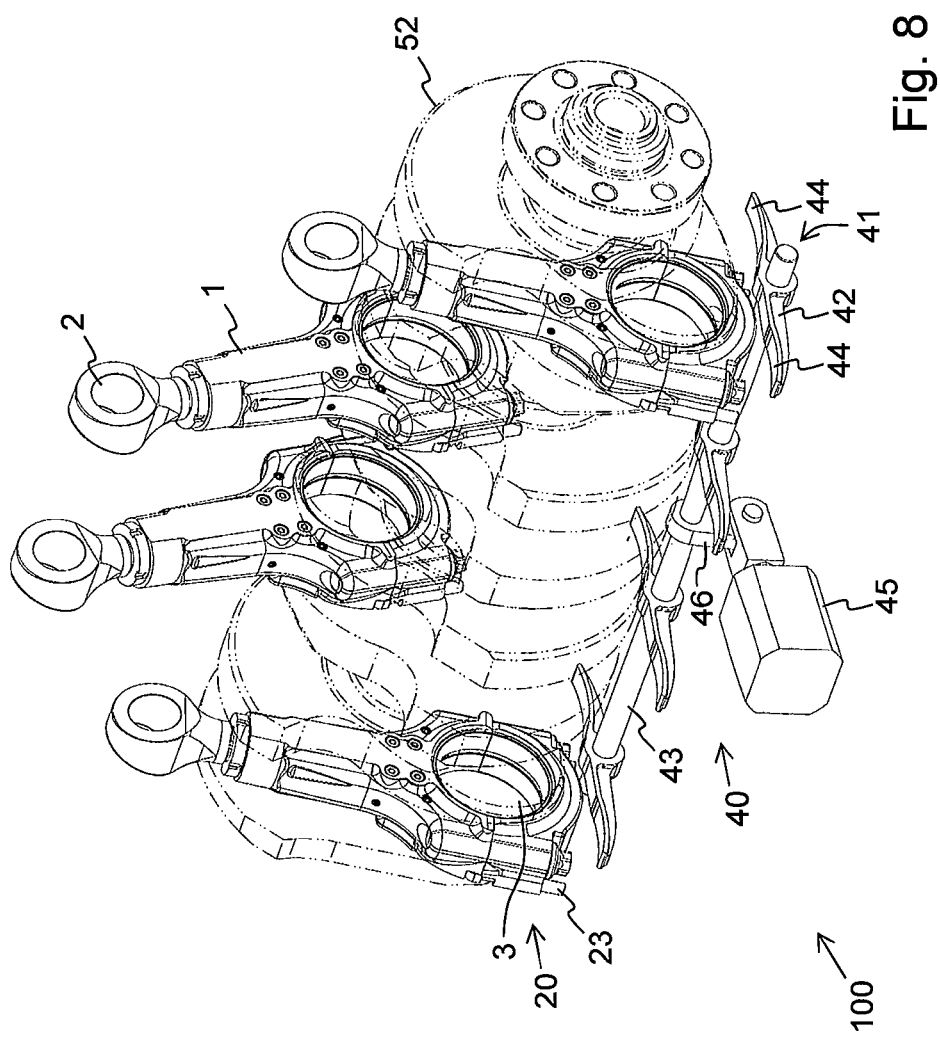
Figure 9:
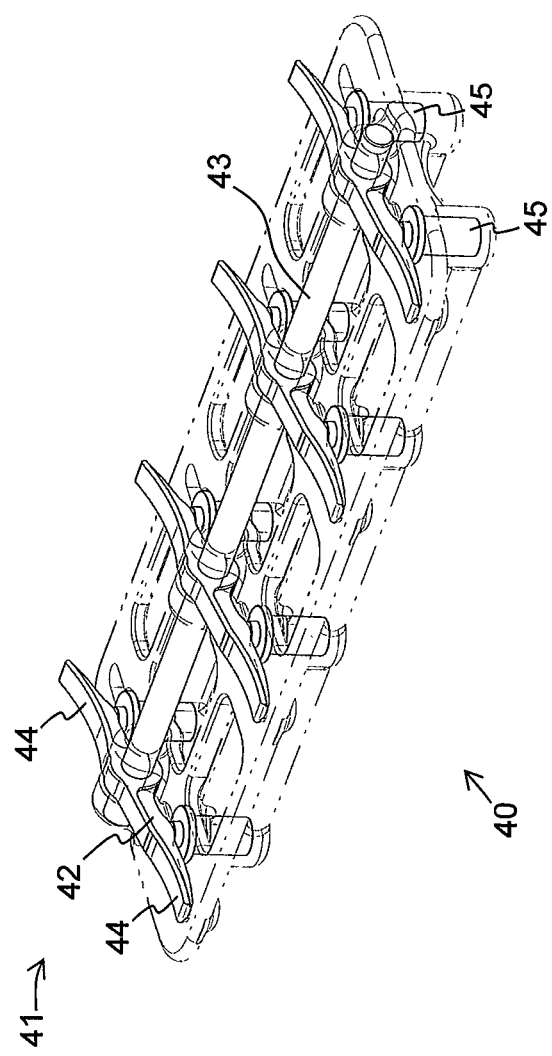
Figure 10:
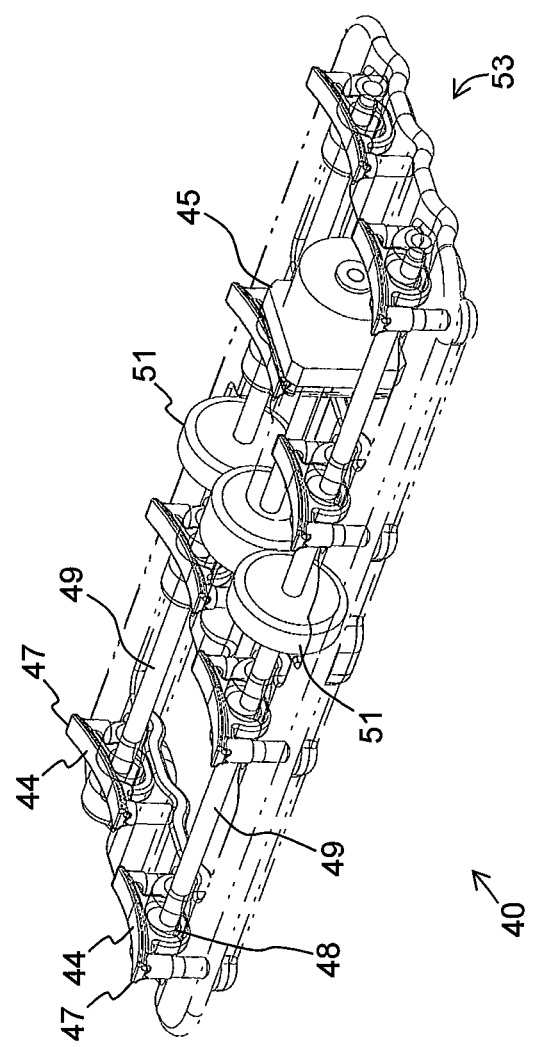
Figure 11:
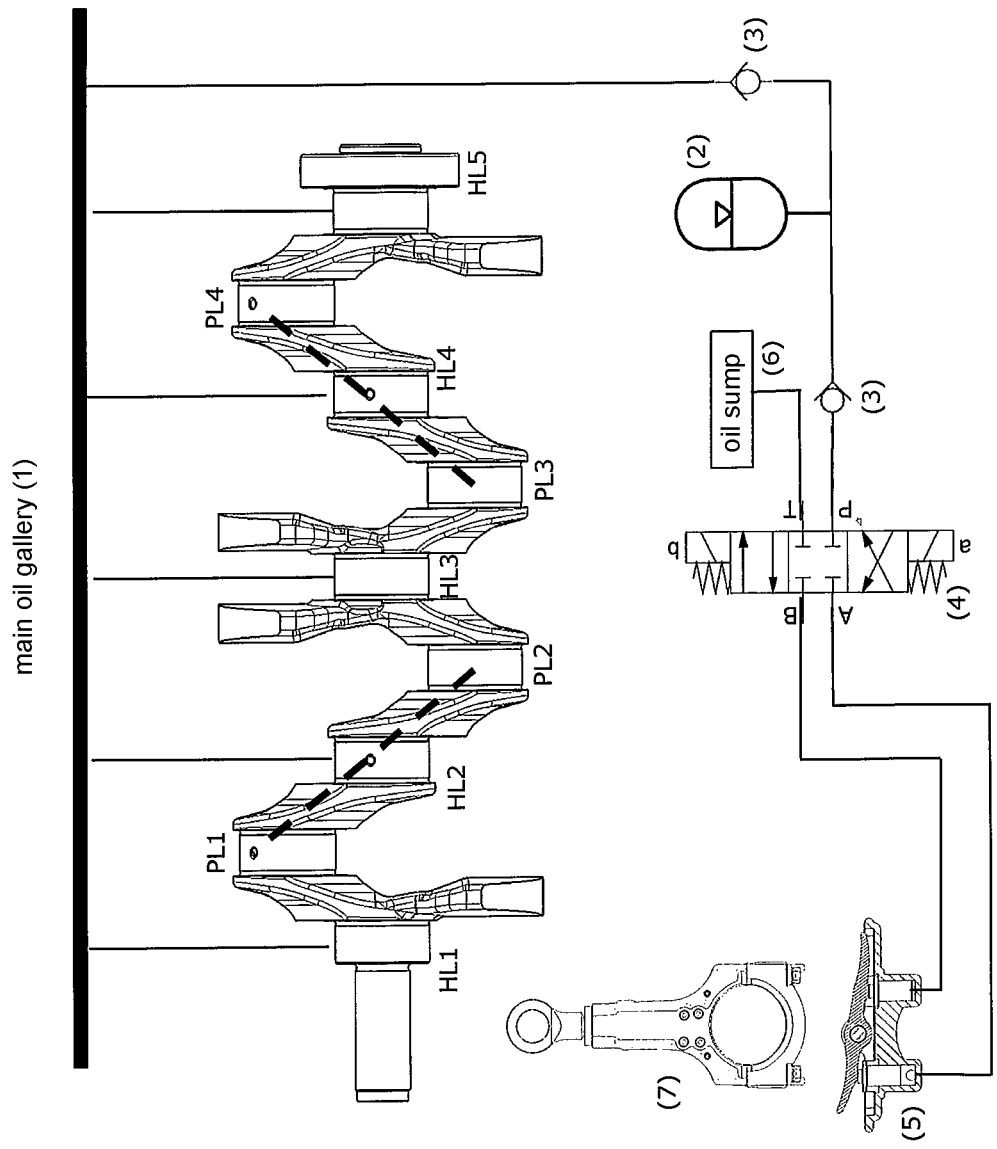
Figure 12:
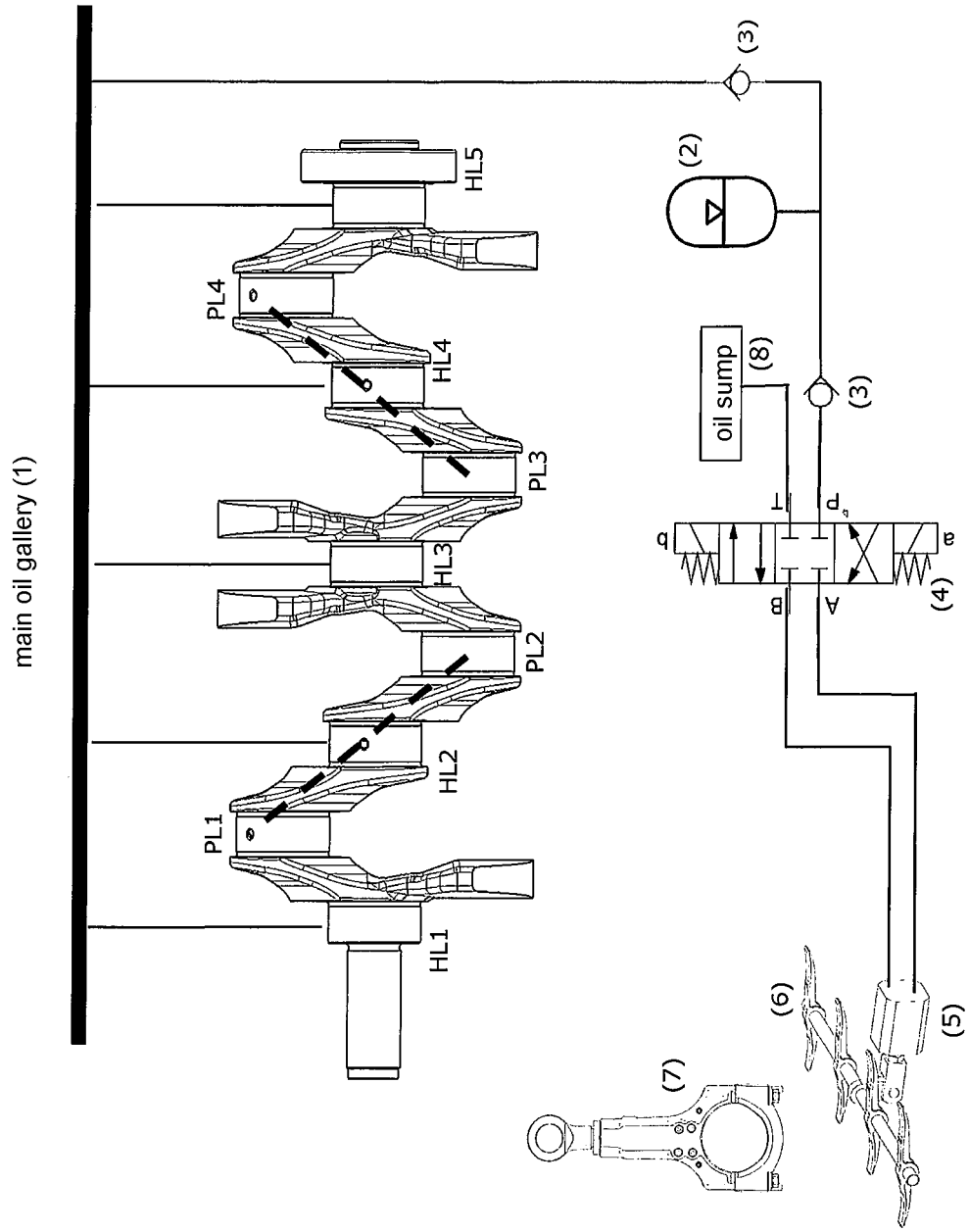
Figure 13:
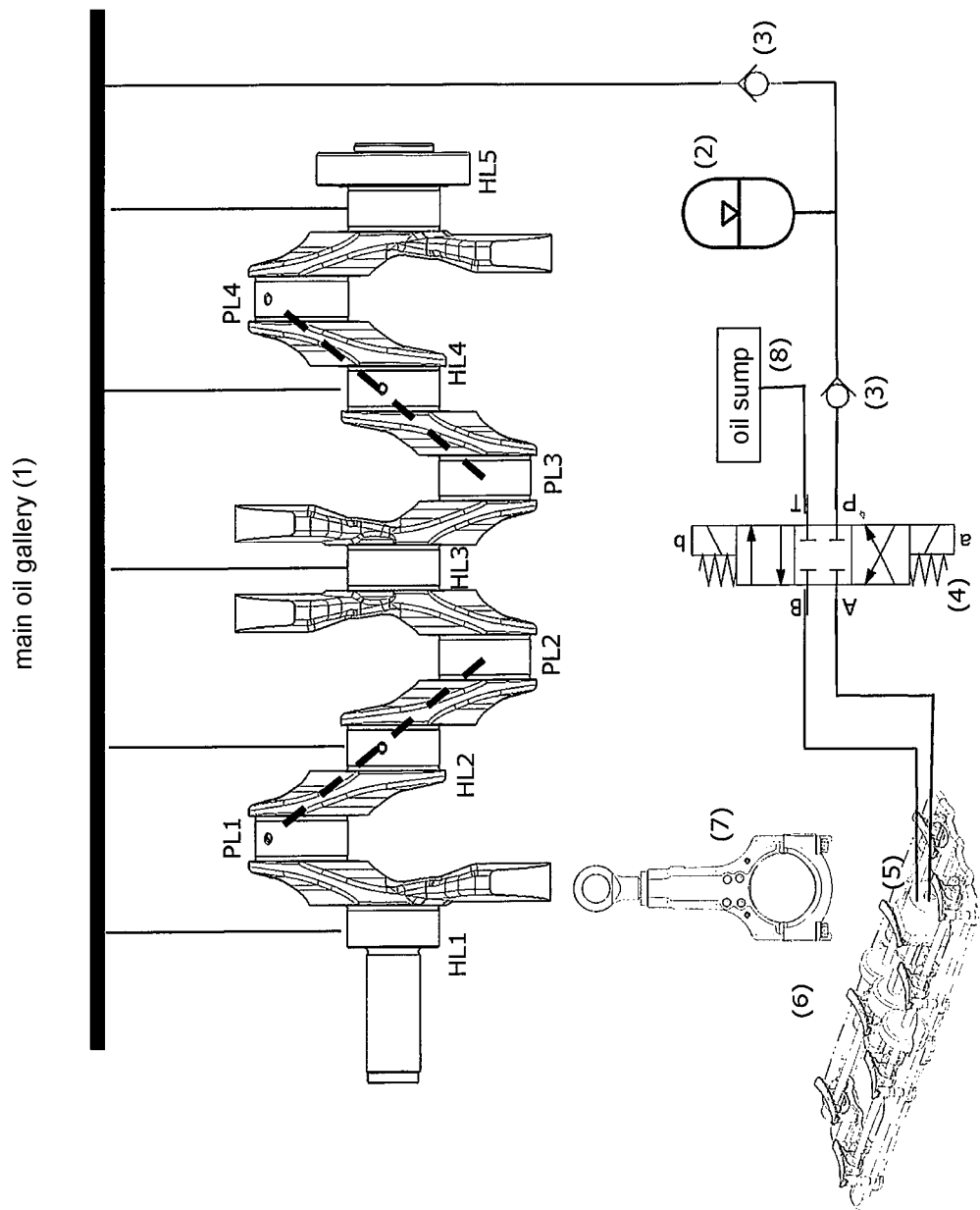
Figure 14:
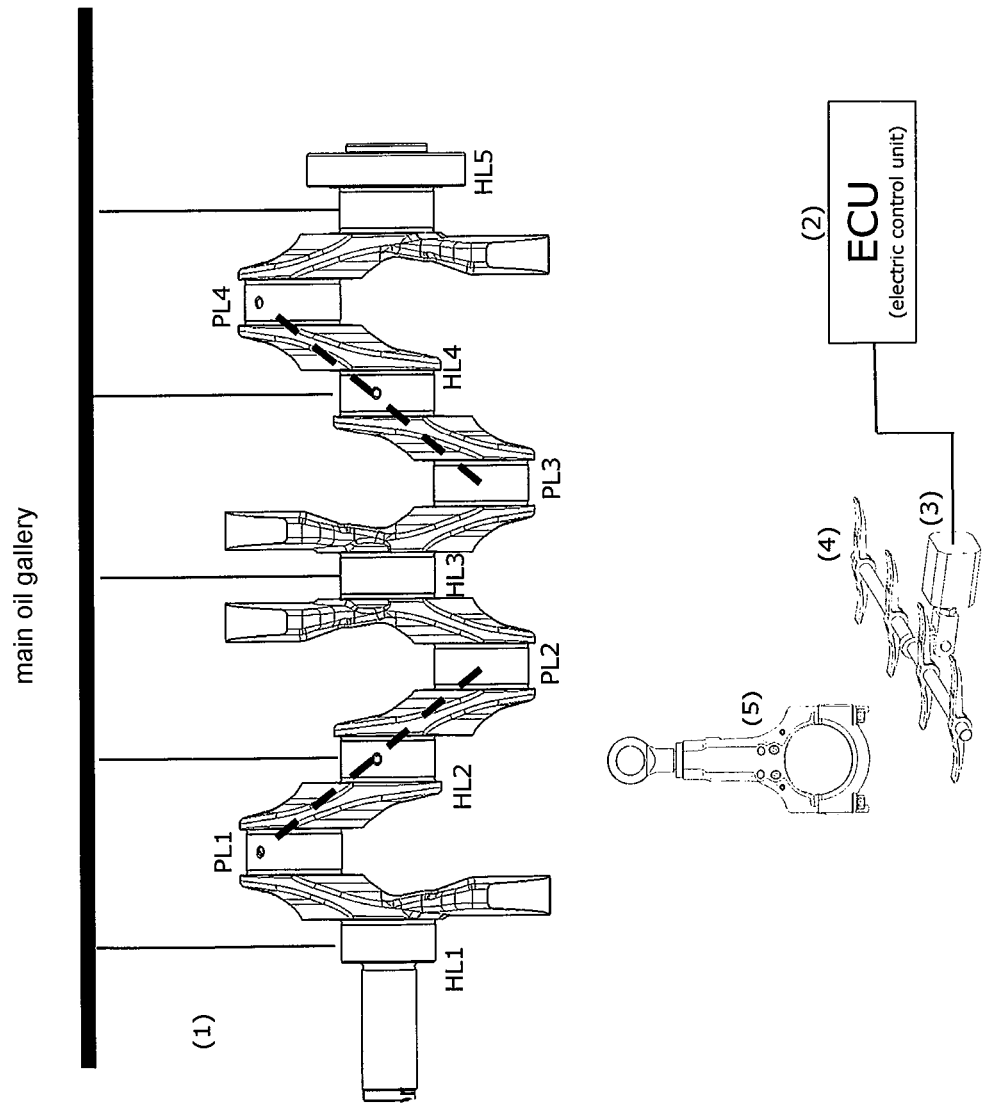
Figure 15:
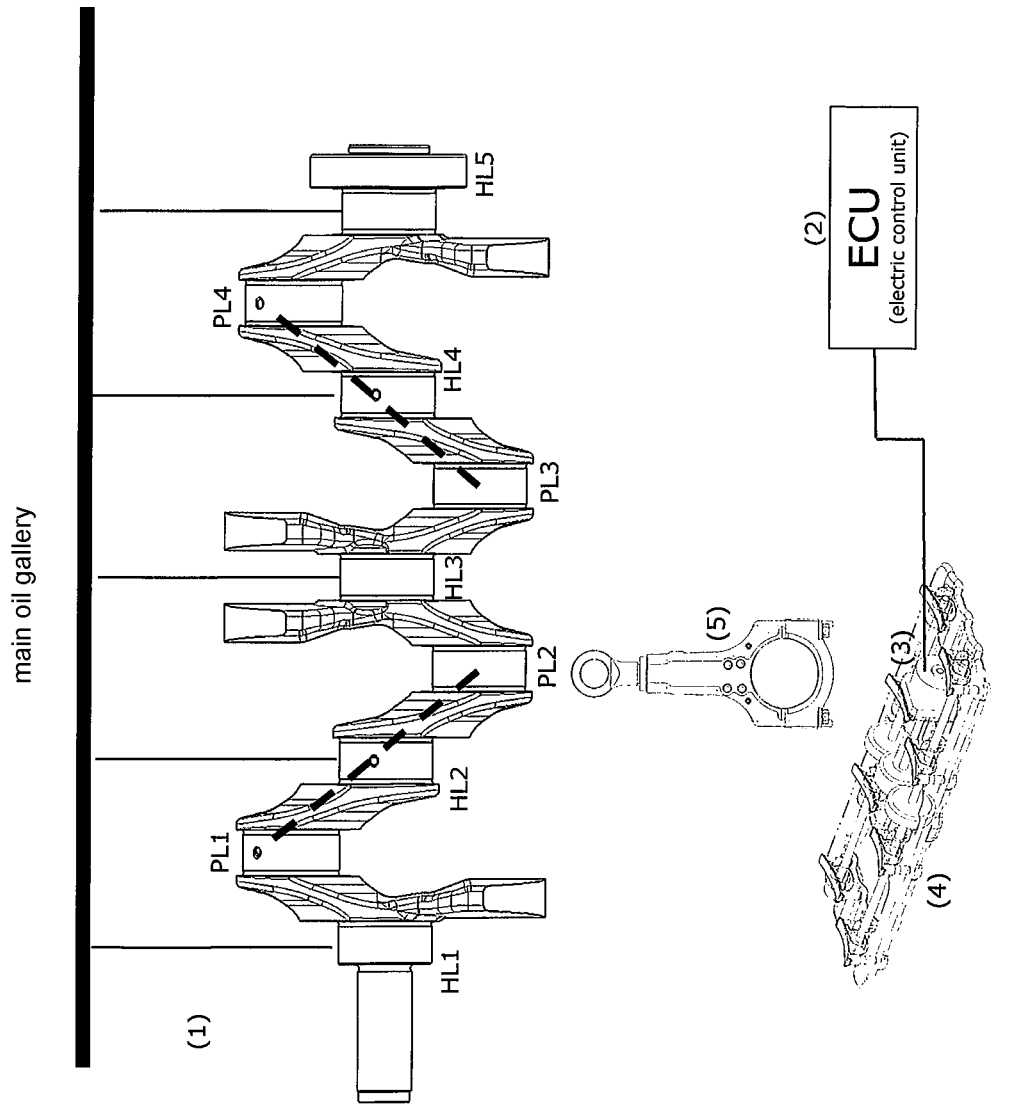

Further characteristics, advantages and possible applications of the invention become clear from the following description in connection with the Figures, in which the same reference signs are used throughout for the same or corresponding elements of the invention. The Figures show, at least partially schematically:

FIG. 1a a first preferred example embodiment of a setting device in a first position;

FIG. 1b the example embodiment of FIG. 1a in a second position;

FIG. 2 a second preferred example embodiment of a setting device;

FIG. 3 a preferred example embodiment of a switching device;

FIG. 4a a first preferred example embodiment of a locking device in three-dimensional representation;

FIG. 4b the locking device of FIG. 4a in a plan view;

FIG. 5a a second preferred example embodiment of a locking device in a three-dimensional representation;

FIG. 5b the locking device of FIG. 5a in a plan view;

FIG. 6 a preferred example embodiment of a part of a piston rod of adjustable length in an exploded view;

FIG. 7 a first preferred example embodiment of an actuating device in an exploded view;

FIG. 8 a preferred example embodiment of a device for adjusting a compression ratio;

FIG. 9 a second preferred example embodiment of an actuating device;

FIG. 10 a third preferred example embodiment of an actuating device;

FIGS. 11 to 13 an oil diagram for a hydraulically switched switching mechanism for the rocker switches in accordance with FIGS. 8 to 10;

FIGS. 14 and 15 an electric switching mechanism for the rocker switches in accordance with FIGS. 8 to 10.

FIGS. 1a and 1b show a first preferred example embodiment of a setting device 20 of a length-adjustable piston rod (not shown) which is arranged to mechanically switch a switching device 10. The switching device 10 preferably comprises non-return valves 11, 11' which are arranged to control the flow of hydraulic medium through hydraulic channels 12 of a length adjustment device 50. The hydraulic channels 12 can open into a first hydraulic chamber 4 or a second hydraulic chamber 5 of the length adjustment device 50, which can be formed by a hydraulic cylinder 6 of the piston rod and a hydraulic piston 7 of the piston rod, in particular a reciprocating piston acting on both sides.

FIG. 1a shows the switching device 10 in a first switching state (state A), in which hydraulic medium can flow out of the second hydraulic chamber 5 via an open non-return valve 11' which can be actuated by the switching device 20. Hydraulic medium which is supplied to the first hydraulic chamber 4, preferably via an inflow channel 13, and in particular subjected to a pressure, can therefore bring about a movement of the hydraulic piston 7 in a direction facing away from a large piston rod eye 3 of the piston rod, as indicated by the arrow 7'. Accordingly, a small piston rod eye (not shown) of the piston rod connected to the hydraulic piston 7 is also moved. If the hydraulic piston 7 strikes a first end face 6' of the hydraulic cylinder 6, which faces away from the large piston rod eye 3, the piston rod has its maximum length.

In FIG. 1*b*, the switching device 10 is in a second switching state (state B), in which hydraulic medium can flow out of the first hydraulic chamber 4 via an open non-return valve 11' which can be actuated by the switching device 20. Hydraulic medium, which is preferably supplied to the second hydraulic chamber 5 via the inflow channel 13 and in particular is subjected to a pressure, can therefore cause a movement of the hydraulic piston 7 in a direction facing towards the large piston rod eye 3 of the piston rod, indicated by the arrow 7'. The small piston rod eye connected to the hydraulic piston 7 is also moved accordingly. If the hydraulic piston 7 strikes a second end face 6" of the hydraulic cylinder 6 facing towards the large piston rod eye 3, the piston rod has its minimum length.

In order to switch the switching device 10, in particular for mechanically actuating the valves 11', in particular in order to transfer the switching device 10 to the first or the second switching state, the setting device 20 comprises a setting unit 21. This preferably comprises an ring slide 21', which is preferably substantially constructed in a circular, annular shape and which is preferably arranged coaxially (perpendicular to the figure plane) with the large piston rod eye 3. Further, the setting unit 21 or the ring slide 21' preferably comprises a ramp 22 arranged in the region of the switching device 10. The setting unit 21 is preferably arranged so as to be rotatable, in particular pivotable or displaceable, along its circumferential direction in such a way that the ramp 22 can interact with a respective one of several valve pins 14—two in the example shown—for opening the non-return valves 11'.

The setting unit 21 is preferably arranged to displace the valve pins 14 substantially perpendicular to the circumferential direction of the setting unit 21 by means of the ramp 22. The non-return valves 11, 11' are preferably constructed as ball valves 15, so that a valve pin 14 can lift a ball 15' of a ball valve 15 from a valve seat 15" of the ball valve 15. This allows the hydraulic fluid to flow out through a drain channel 16 between the ball 15' and the valve seat 15".

In order to rotate the setting unit 21, this is preferably connected to two setting elements 23. Preferably, the two setting elements 23 engage substantially tangentially in the setting unit 21, so that a movement of the setting elements 23 along the arrows 23' exerts a torque on the setting unit 21 and causes a rotation of the setting unit 21.

The setting elements 23 are preferably actuated from outside the piston rod by means of an actuating device (not shown). By means of the arrangement shown in FIGS. 1*a* and 1*b* it is possible to transmit a switching pulse received by the setting elements 23, in particular around the large piston rod eye 3, to the switching device 10, in particular a non-return valve 11. During the movement of the switching unit 21 during the switching process, i.e. during the rotation, it can remain substantially congruent, so that substantially constant mass forces act on the piston rod during operation of an internal combustion engine.

FIG. 2 shows a second preferred example embodiment of a setting device 20 with a setting unit 21. The setting unit 21 is preferably arranged around a large piston rod eye 3 of a piston rod 1 (only partially shown) and is constructed as a ring slide 21'. In particular, the ring slide 21' comprises a first ring element 21*a* constructed in a semi-annular shape and a second ring element 21*b* constructed in a semi-annular shape, which are preferably constructed as identical parts and are therefore neutral in terms of acceleration. The ends 24 of setting elements 23 facing towards a small piston rod eye (not shown) of the piston rod 1 preferably engage between the ends of the ring elements 21*a*, 21*b*, so that a displacement of the setting elements 23 along a longitudinal axis X of the piston rod causes a rotation of the setting unit 21.

In a variant of the invention, only a first ring element 21*a* constructed in a semi-annular shape is provided, which is arranged movably, in particular rotatably, about a half of the large piston rod eye 3 facing towards the small piston rod eye. In this variant, the ends 24 of the setting elements 23 facing towards the small piston rod eye (not shown) of the piston rod 1 interact with the ends 210*a*, 211*a* of the first ring element 21*a* constructed in a semi-annular shape which face away from the small piston rod eye 2 and cause a rotation of the setting unit 21. This variant is indicated by the weaker line thickness of the second semi-annular ring element 21*b*.

Preferably the setting elements 23 are guided through housing sleeves 9 of the piston rod 1, which extend substantially parallel to the longitudinal axis X of the piston rod.

Preferably, the first and second ring elements 21*a*, 21*b* have elongated holes 25, in particular three elongated holes 25, each of which extend in the circumferential direction of the setting unit 21. The setting unit 21, in particular the first and second ring element 21*a*, 21*b*, can be rotatably mounted on the piston rod 1 by means of locking screws 26 extending through the elongated holes 25.

FIG. 3 shows a preferred example embodiment of a switching device 10 with a ball valve 15.

Preferably, when the ball valve 15 is closed, a ball 15' of the ball valve sits on a valve seat 15" of the ball valve 15 and prevents the hydraulic medium from flowing out of a hydraulic chamber (not shown) through a drain channel 16 in the direction of the arrow. In addition to the pressure of the hydraulic medium, the ball 15' is secured to the valve seat 15" by a safety spring 17 of the ball valve 15.

The ball valve 15 can be opened by the ball 15 being lifted by means of a valve pin 14 from the valve seat 15" in the direction of the drain channel 16. The valve pin 14 preferably comprises a pin sleeve 14' for lifting the ball 15' from the valve seat 15" and a pin disc 14", which are tensioned against each other by means of a disc spring 18. When the valve pin 14 is actuated by a setting unit 21, the disc spring 18 preferably dampens a portion of the forces which act on the valve pin 14, in particular on the pin sleeve 14', in particular in the direction of the ball 15'.

The actuation of the switching device 10, i.e. the movement of the valve pin 14 for opening the ball valve 15, is preferably effected by the interaction of a ramp 22 of the setting unit 21 with a collar 19 of the pin disc 14". If the setting unit 21 rotates, i.e. if the setting unit 21 moves in a direction perpendicular to the figure plane, the collar 19 can be guided over the ramp 22 and the pin disc 14" can be moved in the direction of the ball 15'. The disc spring 18 is preferably stiff enough to lift the pin sleeve 14' and the ball 15' contacted by the pin sleeve 14' from the valve seat 15"

against the pressure exerted by the hydraulic medium in the drain channel 16 and by the safety spring 17 on the ball 15'.

FIGS. 4a and 4b show a first preferred example embodiment of a locking device 30, which is arranged to fix a setting device 20. FIG. 4a shows a three-dimensional representation and FIG. 4b a plan view.

The locking device 30 preferably comprises a locking pin 31 which is tensioned by means of a spring means 32. The locking pin 31 and the spring means 32 are arranged in a bore 33 of a partially illustrated piston rod 1. The bore 33 is preferably closed with a screw plug 34, against which the locking pin 31 is supported.

Due to the tensioning, the locking pin 31 can be pressed into a locking recess 27 of the setting unit 21, as a result of which the setting unit 21 can be fixed in a setting state, which preferably corresponds to a switching state of a switching device (not illustrated). If a sufficiently high torque is applied to the setting unit 21, the locking pin 31 can be pressed out of the locking recess 27 against a spring force of the spring means 32 and the setting unit 21 can be transferred to another setting state.

FIGS. 5a and 5b show a second preferred example embodiment of a locking device 30 which is arranged to fix a setting device 20. FIG. 5a shows a three-dimensional representation and FIG. 5b a plan view.

The locking device 30 preferably comprises a locking pin 31 which can be tensioned and which is preferably arranged perpendicular to a setting element 23 of a setting device 20 and which can engage in a locking recess 27 of the setting element 23. The locking recess 27 is constructed in particular as a groove, which, like the locking pin 31, preferably extends perpendicular to a longitudinal axis X of the piston rod.

The locking pin 31 is preferably made of spring steel and is constructed so as to be deformable, in particular bendable. If a sufficiently large force acts on the setting element 23, for example due to an actuating pulse given from outside a piston rod 1 only partially shown, the locking pin 31 can be pressed out of the locking pin 27 under tension, so that the setting element 23 can move along the longitudinal axis X of the piston rod, in particular be transferred to another setting state.

FIG. 6 shows a preferred example embodiment of a portion of a length-adjustable piston rod 1 with a switching device 10 and a setting device 20 in an exploded view. The illustrated portion of the piston rod 1 has a large piston rod eye 3, which is formed by two bearing shells 3' secured by means of a bearing cover 1', wherein the bearing cover 1' can be connected to the piston rod 1 by means of two piston rod screws 8.

The switching device 10 preferably comprises non-return valves 11', in particular two non-return valves 11', which can be actuated by means of the setting device 20. These are preferably arranged in a region of the piston rod eye 3, which is located opposite the bearing cover 1'.

In order to actuate the switching device 10 or the non-return valves 11', the switching device 20 preferably comprises a setting unit 21 with a first ring element 21a constructed in a semi-annular shape and a second ring element 21b constructed in a semi-annular shape, which surround the large piston rod eye 3 and can thereby transmit an actuating pulse, in particular from a region of the large piston rod eye 3 located opposite the non-return valves 11', to the non-return valves 11'.

The first ring element 21a preferably has a ramp (not shown) for actuating the non-return valves 11' and is rotatably mounted on the piston rod 1 by means of a guide plate 26'. The second ring element 21b preferably has three elongated holes 25 which extend in the circumferential direction of the second ring element 21b and which can be penetrated by guide screws 26 for the purpose of rotatably, in particular pivotably or displaceably, supporting the second ring element 21b on the bearing cover 1'.

The setting device 20 preferably comprises two setting elements 23, wherein one end 24 of each of the setting elements 23 which faces away from the bearing cover 1' is arranged between one end of the first ring element 21a and one end of the second ring element 21b. In this way, a movement of the setting elements 23 along a longitudinal axis X of the piston rod can be converted into a movement of the setting unit 21 along a circumferential direction of the setting unit 21, i.e. into a rotation of the setting unit 21.

The bearing cover 1' preferably has respective housing sleeves 9 in the region of through-holes in order to accommodate the piston rod screws 8, which housing sleeves 9 are arranged to accommodate a setting element 23 and to guide it displaceably along the longitudinal axis X of the piston rod.

The piston rod 1 preferably also has a locking device 30 for fixing the setting device 20 in a setting state in which, for example, a non-return valve 11' that can be actuated by the setting unit 21 remains open.

The length-adjustable piston rod 1 also has a hydraulic piston (not shown) which is connected via a shaft (not shown) to a small piston rod eye (not shown). The small piston rod eye is arranged at an end of the piston rod 1 opposite the large piston rod eye 3.

The hydraulic piston is arranged displaceably in a hydraulic cylinder 6 so that the hydraulic piston and the hydraulic cylinder 6 form a first and a second hydraulic chamber (not shown) which can be supplied with a hydraulic medium. By actuating the switching device 10, the flow of the hydraulic medium into and out of the hydraulic chambers can be controlled in such a way that the hydraulic piston, and thus the small piston rod eye, moves along the longitudinal axis X of the piston rod, as a result of which the overall length of the piston rod 1 is changed.

The arrangement, shown in FIG. 6, of the components of the piston rod 1 or their construction is advantageously suitable for transmitting an actuating pulse, which, in the region of the large piston rod eye 3, in particular in the region of a side of the large piston rod eye 3 which faces away from the small piston rod eye, is transmitted to the setting device 20, in particular to at least one of the setting elements 23, to the switching device 10 which is arranged in the region of the large piston rod eye 3, in particular in the region of a side of the large piston rod eye 3 which faces towards the small piston rod eye.

FIG. 7 shows a first example embodiment of an actuating device 40 in an exploded view. The actuating device 40 is constructed as a rocker switch 41 and preferably comprises a rocker head 42 which is mounted on a rocker axle 43 in such a way that it can be tilted.

The rocker head 42 preferably has two effective surfaces 44 which can be engaged by means of a setting device, in particular two setting elements, of an piston rod of adjustable length (not shown). An actuating pulse is preferably transmitted by means of one of the two effective surfaces 44 to one of the two setting elements, wherein the actuating pulse preferably depends on, or is indicated by, a tilting position of the rocker head 42.

The rocker head 42 can be moved to different tilt positions by means of an actuator 45, wherein each tilt position corresponds to a setting state of the setting device or a switching state of a switching device of the piston rod (not shown) and thus to an overall length of the piston rod. The actuator 45 is preferably connected to a rocker lever 46 of the rocker head 42 for this purpose.

The actuator 45 can preferably be controlled hydraulically, pneumatically, electrically or by means of a partial vacuum.

FIG. 8 shows an example embodiment of a device 100 for setting a compression ratio of an internal combustion engine with piston rods 1 of adjustable length and an actuating device 40 for actuating setting devices 20 of the piston rods 1. The actuating device 40 is constructed as a rocker switch 41, which is arranged in the region of a crankshaft 52 of the internal combustion engine.

The crankshaft 52 preferably carries four length-adjustable piston rods 1, which are pivotably supported on crankpins (not shown) of the crankshaft 52. When the crankshaft 52 rotates, the piston rods 1, in particular a large piston rod eye 3 or a region on a side of the large piston rod eye 3 which faces away from a small piston rod eye 2, preferably follow a predetermined trajectory curve.

The rocker switch 41 is arranged on the crankshaft 52 in such a way that setting elements 23 of the setting devices 20 of the piston rods 1 interact at a point of the predetermined trajectory curve with effective surfaces 44 of a respective rocker head 42 of the rocker switch 41. Thus, depending on the tilting position of the rocker heads 42, a switching pulse can be transmitted to the setting devices 20 of the piston rods 1 at this one point of the predetermined trajectory curve, or the setting devices 20 can be actuated from outside the piston rod 1.

In order to set the tilting position of the rocker heads 42, they preferably are supported by a rocker axle 43, preferably in a rotationally fixed manner or in a manner secured against rotation. The rocker axle 43 preferably comprises a rocker lever 46, which can be connected to an actuator 45 for setting the rocker position.

FIG. 9 shows a second example embodiment of an actuating device 40 constructed as a rocker switch 41. A tilting position of rocker heads 42 of the rocker switch 41, which are preferably mounted on a rocker axle 43 in such a way that they can be pivoted or tilted, can be set by actuators 45, which are connected to the rocker heads of 42 opposite the effective surfaces 44 of the rocker heads 42.

By means of the example embodiment shown in FIG. 9, the rocker heads 42 can respectively be brought, independently of each other, into a specified tilt position and thus the length of length-adjustable piston rods on a crankshaft of an internal combustion engine can be set individually.

FIG. 10 shows a third example embodiment of an actuating device 40 constructed as a switching platform 53, which has two actuating elements 47 for actuating a setting device of a piston rod of adjustable length. Preferably, each of the actuating elements 47 has an effective surface 44 for interaction with a respective setting element of the setting device.

The actuating elements 47 are preferably mounted such that they can be moved, in particular extended, in a direction which is perpendicular to eccentric axles 49 of the switching platform 53. In order to be able to actuate a setting element of the setting device, the actuating elements 47 can be moved from a retracted state to an extended state and vice versa, preferably by means of eccentric elements 48 which are mounted on the eccentric axles 49 in a rotationally fixed manner and which each interact with one side of the actuating elements 47 opposite the effective surface 44.

The eccentric axles 49 can be mechanically connected to each other, in particular via friction wheels or gear wheels 51 which are in engagement with each other. At least one of the friction wheels or gear wheels 51 can be connected to an actuator 45 in order to set the eccentric axles 49 in rotation and thus control the movement or the retraction and/or extension of the actuating elements 47.

FIG. 11 shows an oil diagram for a hydraulically switched switching mechanism for the rocker switch in accordance with FIG. 9. The rocker switch is switched hydraulically via actuator pistons (multiple actuators).

Here, (1) designates a main oil gallery, (2) a pressure accumulator, (3) a non-return valve, (4) a 4/3-way valve (electrically actuated), (5) a hydraulic actuator piston for the rocker (multiple actuators), (6) an oil sump and (7) a mechanically actuated VCR piston rod.

FIG. 12 shows an oil diagram for a hydraulically switched switching mechanism for the rocker switches in accordance with FIG. 8. The rocker switches are arranged on a common shaft. The adjustment is carried out by means of a hydraulic actuator (single actuator).

Here, in contrast to FIG. 11, (5) designates a hydraulic single actuator for the rocker switches, (6) the rocker switches, (7) a mechanically actuated VCR piston rod and (8) an oil sump.

FIG. 13 shows an oil diagram for a hydraulically switched switching mechanism for the rocker switches in accordance with FIG. 10. There are separate rocker switches for each switching pin. The adjustment is carried out by means of a hydraulic actuator (single actuator).

The reference signs correspond to those of FIG. 12.

FIG. 14 shows an electric switching mechanism for the rocker switches in accordance with FIG. 8. The rocker switches are arranged on a common shaft. The adjustment is carried out by means of an electric actuator (single actuator).

Here, (1) designates an oil supply for the crankshaft/the VCR piston rod, (2) an ECU (engine control unit), (3) an electric servomotor, (4) the rocker switches and (5) a mechanically actuated VCR piston rod.

FIG. 15 shows an electric switching mechanism for the rocker switches in accordance with FIG. 10. There are separate rocker switches for each switching pin. The adjustment is carried out by means of an electric actuator (single actuator).

The reference signs correspond to those of FIG. 14.

LIST OF REFERENCE SIGNS

1 Piston rod
1' Bearing cover
2 Small piston rod eye
3 Large piston rod eye
4 First hydraulic chamber
5 Second hydraulic chamber
6 Hydraulic cylinder
6' First end face
6" Second end face
7 Hydraulic piston
7' Direction of movement of the hydraulic piston
8 Piston rod screws
9 Housing sleeves
10 Switching device
11 Non-return valve
11' Non-return valve actuatable by the setting device
12 Hydraulic channels
13 Inflow channel
14 Valve pin 14' Pin sleeve
14" Pin disc
15 Ball valve
15' Ball
15" Valve seat
16 Drain channel
17 Safety spring
18 Disc spring
19 Collar
20 Setting device
21 Setting unit
21' Ring slide
21a First ring element
210a, 211a Ends of the first ring element
21b Second ring element
22 Ramp
23 Setting elements
24 End of the setting elements
25 Elongated hole
26 Locking screws
27 Locking recess
30 Locking device
31 Locking pin
32 Spring element
33 Bore
34 Screw plug
40 Actuating device
41 Rocker switch
42 Rocker head
43 Rocker axle
44 Effective surface
45 Actuator
46 Rocker lever
47 Actuating element
48 Eccentric element
49 Eccentric axle
50 Length adjustment device
51 Friction wheel or gear wheel
52 Crankshaft
53 Switching platform
X Longitudinal axis of the piston rod

What is claimed is:

1. A piston rod of adjustable length for an internal combustion engine, comprising:
a small piston rod eye and a large piston rod eye, the large piston rod eye comprising:
a switching device operable to control the length of the piston rod; and
a setting device configured to be actuated from outside the piston rod;
wherein the setting device comprises a setting unit that is rotatably mounted, wherein the setting unit is operable to mechanically switch the switching device by rotating the setting unit, and wherein the setting unit comprises a ring slide rotatably mounted around the large piston rod eye of the piston rod and the setting unit is configured to transmit, to the switching device, a switching pulse received from outside the piston rod.

2. The piston rod according to claim 1, further comprising a length adjustment device that is hydraulically operable to adjust the length of the piston rod, wherein the switching device is operable to control a flow of a hydraulic medium for operating the length adjustment device.

3. The piston rod according to claim 1, wherein the ring slide comprises a first ring element constructed in a semi-annular shape and movably arranged around a half of the large piston rod eye facing towards the small piston rod eye, wherein the setting device further comprises two setting elements mounted displaceably along the piston rod, and wherein ends of the two setting elements, facing towards the small piston rod eye, interact with ends of the first ring element constructed in a semi-annular shape facing away from the small piston rod eye.

4. The piston rod according to claim 1, wherein the ring slide comprises a first ring element constructed in a semi-annular shape and a second ring element constructed in a semi-annular shape, and wherein the setting device further comprises two setting elements mounted displaceably along the piston rod, and wherein ends of the two setting elements, facing towards the small piston rod eye, respectively engage between the first and second ring elements.

5. The piston rod according to claim 2, wherein the switching device comprises at least one non-return valve for regulating the flow of the hydraulic medium.

6. The piston rod according to claim 5, wherein the at least one non-return valve comprises at least one ball valve, and the setting device is operable to lift a ball of the at least one ball valve from a valve seat of the at least one ball valve by rotating the setting unit, or to unblock the valve seat by rotating the setting unit.

7. The piston rod according to claim 1, wherein the setting unit comprises a ramp operable to actuate the switching device.

8. The piston rod according to claim 1, further comprising a locking device operable to fix the setting device in a setting state.

9. The piston rod according to claim 8, wherein the setting device comprises at least one locking recess, and the locking device comprises at least one tensionable locking pin, and wherein the at least one locking recess is configured to engage the locking pin in the locking recess in the setting state.

10. A device for setting a compression ratio in an internal combustion engine, comprising:
a piston rod of adjustable length which includes:
a small piston rod eye; and
a large piston rod eye including a switching device operable to control the length of the piston rod and a setting device configured to be actuated from outside the piston rod, wherein the setting device comprises a setting unit that is mounted rotatably around its own axis, and wherein the setting unit is operable to mechanically switch the switching device by rotating the setting unit; and
an actuating device operable to mechanically actuate the setting device.

11. The device according to claim 10, wherein the actuating device is a rocker switch comprising a rocker head with two effective surfaces coupled to the setting device, and wherein a tilting of the rocker head causes a rotation of the setting unit.

12. The device according to claim 11, wherein the rocker head is rotationally fixedly mounted on a rocker axle or is rotatably mounted on the rocker axle and is pivotable by an actuator, and wherein the actuator is connected to the rocker axle or the rocker head via a rocker lever.

13. The device according to claim 10, wherein the actuating device is a switching platform comprising at least two actuating elements, and wherein each actuating element has an effective surface, and wherein the effective surface is moveable in a direction perpendicular to an eccentric axle using an eccentric element, and wherein the eccentric element rests on an eccentric axle.

14. The device according to claim 10, further comprising a reciprocating piston engine, wherein the device is configured to set a compression ratio of the reciprocating piston engine.

15. A piston rod of adjustable length for an internal combustion engine, comprising:
- a small piston rod eye and a large piston rod eye, the large piston rod eye comprising:
    - a switching device operable to control the length of the piston rod; and
    - a setting device configured to be actuated from outside the piston rod;
- wherein the setting device comprises a setting unit that is mounted rotatably around its own axis, and wherein the setting unit is operable to mechanically switch the switching device by rotating the setting unit.

* * * * *